United States Patent [19]

DuPont et al.

[11] Patent Number: 5,877,102
[45] Date of Patent: Mar. 2, 1999

[54] VERY DARK GREY SODA-LIME GLASS

[75] Inventors: Camille DuPont, Heppignies; Daniel D'Hont, Maffle, both of Belgium

[73] Assignee: Glaverbel, Brussels, Belgium

[21] Appl. No.: 707,256

[22] Filed: Sep. 3, 1996

[30] Foreign Application Priority Data

Sep. 6, 1995 [LU] Luxembourg ............................. 88 651

[51] Int. Cl.$^6$ ................................................. C03C 3/087
[52] U.S. Cl. ................................ 501/71; 501/64; 501/905
[58] Field of Search ................................. 501/71, 61, 905

[56] References Cited

U.S. PATENT DOCUMENTS

| | | | |
|---|---|---|---|
| 3,723,142 | 3/1973 | Kato et al. | 501/71 |
| 5,278,108 | 1/1994 | Cheng et al. | 501/1 |
| 5,308,805 | 5/1994 | Baker et al. | 501/71 |
| 5,346,867 | 9/1994 | Jones et al. | 501/71 |
| 5,352,640 | 10/1994 | Comnbes et al. | 501/71 |
| 5,411,922 | 5/1995 | Jones | 501/71 |
| 5,478,783 | 12/1995 | Higby et al. | 501/27 |
| 5,521,128 | 5/1996 | Jones et al. | 501/71 |
| 5,523,263 | 6/1996 | Penrod | 501/27 |
| 5,565,388 | 10/1996 | Krumwiede et al. | 501/70 |
| 5,650,365 | 7/1997 | Higby et al. | 501/71 |
| 5,728,471 | 3/1998 | Dupont et al. | 501/69 |

FOREIGN PATENT DOCUMENTS

| | | |
|---|---|---|
| 0452207 | 10/1991 | European Pat. Off. . |
| 0482535 | 4/1992 | European Pat. Off. . |
| 0536049 | 4/1993 | European Pat. Off. . |
| 0653388 | 5/1995 | European Pat. Off. . |
| 0705800 | 4/1996 | European Pat. Off. . |

*Primary Examiner*—Karl Group
*Attorney, Agent, or Firm*—Venable; George H. Spencer; Ashley J. Wells

[57] ABSTRACT

Soda lime glass including glass-forming constituents for soda lime glass; and coloring agents including iron, cobalt and selenium present in a form and in an amount as percent by weight of the soda lime glass as follows:

from 1.00 to 1.65% of $Fe_2O_3$;

from 0.017 to 0.030% of Co; and from 0.001 to 0.010% of Se.

The soda lime glass has a very dark grey color, a total luminous transmission measured for Illuminant A for a glass thickness of 4 mm (TLA4) of less than 20%, and a total energy transmission measured for a glass thickness of 4 mm (TE4) of less than 20%. This glass is particularly suitable for vehicle roof panels.

23 Claims, No Drawings

VERY DARK GREY SODA-LIME GLASS

CROSS-REFERENCE TO RELATED APPLICATION

This application claims the priority of Grand Duchy of Luxemburg Patent Application n° 88 651 dated 6 Sep., 1995 and titled "Very dark grey soda-lime glass", the subject matter of which is incorporated herein by reference.

BACKGROUND OF THE INVENTION

1. Field of the Invention

The present invention relates to a very dark grey coloured soda-lime glass composed of glass-forming constituents and colouring agents.

The expression "soda-lime glass" is used here in a wide sense and concerns any glass composed of the following constituents (percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

This type of glass is used very widely in the field of glazing for buildings or motor vehicles. It is generally manufactured in the form of a ribbon by a drawing or float process. A ribbon of this type may be cut up in the form of sheets which may then be made curved or subjected to a treatment, for example heat treatment, to reinforce the mechanical properties.

2. Description of the Related Art

When speaking of the optical properties of a sheet of glass, it is generally necessary to relate these properties to a standard illuminant. In the present description, two standard illuminants are used; Illuminant C and Illuminant A as defined by the International Commission on Illumination (C.I.E.). Illuminant C represents average daylight having a colour temperature of 6700 K. This illuminant is especially useful for evaluating the optical properties of glasses intended for buildings. Illuminant A represents the radiation of a Planck radiator at a temperature of about 2856 K. This illuminant represents the light emitted by car headlamps and is essentially intended to evaluate the optical properties of glass intended for motor vehicles. The International Commission on Illumination has also published a document entitled "Colorimetry, Official Recommendations of the C.I.E." (May 1970) which describes a theory according to which the colorimetric coordinates for the light of each wavelength of the visible spectrum are defined in such a way as to be represented on a diagram (known as the C.I.E. trichromatic diagram) having orthogonal axes x and y. This trichromatic diagram shows the location representing the light for each wavelength (expressed in nanometers) of the visible spectrum. This location is called the "spectrum locus" and the light whose coordinates are situated on this spectrum locus is said to possess a 100% excitation purity for the appropriate wavelength. The spectrum locus is closed off by a line called the purple boundary which joins the points of the spectrum locus, the coordinates of which correspond to wavelengths of 380 nm (violet) and 780 nm (red). The area included within the spectrum locus and the purple boundary is that available for the trichromatic coordinates of any visible light. The coordinates of the light emitted by Illuminant C, for example, correspond to x=0.3101 and y=0.3163. This point C is considered as representing white light and on account of this has an excitation purity equal to zero for any wavelength. Lines may be drawn from the point C to the spectrum locus at any desired wavelength and any point situated on these lines may be defined not only by its coordinates x and y, but also as a function of the wavelength corresponding to the line on which it is situated and its distance from the point C with respect to the total length of the wavelength line. From this, light transmitted by a coloured sheet of glass may be described by its dominant wavelength and its excitation purity expressed in percent.

In fact the C.I.E. coordinates of light transmitted by a coloured glass sheet will depend not only on the composition of the glass but also on its thickness. In the present description and claims all the values of the trichromatic coordinates (x,y), of the excitation purity (P), of the dominant wavelength $\lambda_D$ of the transmitted light, and of the light transmittance of the glass (TL) are calculated from the specific internal transmission ($SIT_\lambda$) of a 5 mm thick glass sheet. The specific internal transmission of a glass sheet is governed solely by the absorption of the glass and may be expressed by the Beer-Lambert law; $SIT_\lambda = e^{-E \cdot A\lambda}$ where $A\lambda$ is the absorption coefficient of the glass (in $cm^{-1}$) at the wavelength in question and E is the thickness of the glass (in cm). As a first approximation, $SIT_\lambda$ may also be represented by the formula $$(I_{3\lambda} + R_{2\lambda})/(I_{1\lambda} - R_{1\lambda})$$

where $I_{1\lambda}$ is the intensity of the incident visible light on the first face of the glass sheet, $R_{1\lambda}$ is the intensity of the visible light reflected by this face, $I_{3\lambda}$ is the intensity of the visible light transmitted from the second face of the glass sheet and $R_{2\lambda}$ is the intensity of the visible light reflected to the interior of the sheet by this second face.

In the present description and claims, the following are used.

The total luminous transmission for illuminant A, measured for a thickness of 4 mm (TLA4). This total transmission is the result of integrating the expression:

$$\Sigma T_\lambda \cdot E_\lambda \cdot S_\lambda / \Sigma \cdot E_\lambda S_\lambda$$

between the wavelengths 380 and 780 nm, in which $T_\lambda$ is the transmission at wavelength $\lambda$, $E_\lambda$ is the spectral distribution of illuminant A and $S_\lambda$ is the sensitivity of the normal human eye as a function of the wavelength $\lambda$.

The total energy transmission, measured for a thickness of 4 mm (TE4). This total transmission is the result of integrating the expression:

$$\Sigma T_\lambda \cdot E_\lambda / \Sigma \cdot E_\lambda$$

between the wavelengths 300 and 2150 nm, in which $E_\lambda$ is the spectral energy distribution of the sun at 30° above the horizon (Moon's distribution).

The total transmission in the ultra-violet, measured for a thickness of 4 mm (TUVT4). This total transmission is the result of integrating the expression:

$$\Sigma T_\lambda \cdot U_\lambda / \Sigma \cdot U_\lambda$$

between the wavelengths 280 and 380 nm, in which $U_\lambda$ is the spectral distribution of ultra-violet radiation having passed through the atmosphere, as determined as in DIN standard 67507.

When the transmission curve of a transparent substance does not vary as a function of the visible wavelength, this substance is described as "neutral grey". In the C.I.E. system, it does not possess a dominant wavelength and its excitation purity is zero. By extension, a body may be considered as grey for which the spectral curve is relatively flat in the visible region but nevertheless exhibits weak absorption bands, enabling a dominant wavelength to be defined and a purity that is low but not zero. Grey glass according to the present invention preferably has an excitation purity of less than 12% and a dominant wavelength between 460 and 490 nm, corresponding to a bluish shade. The glass according to the present invention has a very dark grey tint corresponding to a total luminous transmission of Illuminant A, measured for a thickness of 4 mm (TLA4), of less than 20%.

Grey glasses are generally selected for their protecting properties against the rays of the sun and their use in buildings is known, especially in very sunny countries. Grey glasses are also used in balcony balustrades or staircases as well as for partial glazing in certain motor vehicles or railway compartments to shield their contents from view.

The present invention relates to a very dark grey glass especially appropriate for installation in vehicles roofs, for example as an automobile sunroof or a complete roof panel.

SUMMARY OF THE INVENTION

The present invention provides a very dark grey coloured soda-lime glass composed of glass-forming constituents and colouring agents, characterised in that the elements iron, cobalt and selenium are present as colouring agents in the following proportions (expressed in the form indicated as percentages by weight of the glass):

| | |
|---|---|
| $Fe_2O_3$ | 1.00 to 1.65% |
| Co | 0.017 to 0.030% |
| Se | 0.001 to 0.010% | the proportions of colouring agents being such that the glass has a total luminous transmission, measured for Illuminant A for a glass thickness of 4 mm (TLA4), of less than 20%, and a total energy transmission, measured for a glass thickness of 4 mm (TE4), of less than 20%.

Such a coloured glass has a very dark grey appearance and has low luminous transmission and energy transmission properties which are particularly suitable for its use as protection against solar radiation, especially for vehicle sunroofs or roof panels.

In fact, a grey-coloured glass can be produced by using nickel as the main colouring agent. The presence of nickel however presents certain disadvantages, especially when the glass has to be produced by the float process. In the float process, a ribbon of hot glass is led along the surface of a bath of molten tin so that its faces are plane and parallel. In order to avoid oxidation of the tin at the surface of the bath, which would lead to entrainment of tin oxide by this ribbon, a reducing atmosphere is maintained above the bath. When the glass contains nickel, this is partially reduced by the atmosphere above the tin bath giving rise to a haze in the glass produced. In addition, nickel present in the glass may form nickel sulphide NiS. This sulphide exists in various crystalline forms, which are stable within different temperature ranges, transformation from one to the other creating problems when the glass has to be reinforced by a heat tempering treatment, as is the case in the automotive field and also for certain glazing used in buildings (balconies, spandrels, etc.). Glass according to the invention, which does not contain nickel, is thus particularly well suited to manufacture by the float process as well as to architectural use or in the field of motor or other vehicles.

The combined presence of iron, selenium and cobalt colouring agents enables the optical and energy properties of grey glass according to the invention to be controlled. The effects of different colouring agents considered individually for the preparation of a glass are as follows (as described in the German handbook "Glas" by H. Scholtze,—translated by J. Le Dû—Glass Institute—Paris):

Iron: Iron is in fact present in most glasses existing on the market, either as an impurity or introduced deliberately as a colouring agent. The presence of ferric ions ($Fe^{3+}$), gives glass a slight absorption of visible light having a short wavelength (410 and 440 nm) and a very strong absorption band in the ultra-violet (absorption band centred on 380 nm), whereas the presence of ferrous ($Fe^{2+}$) ions causes a strong absorption in the infra-red (absorption band centred on 1050 nm). Ferric ions give glass a slight yellow colour whereas ferrous ions give a more pronounced blue-green coloration.

Selenium: The $Se^{4+}$ cation has practically no colouring effect, whereas the uncharged element $Se^0$ gives a pink coloration. The $Se^{2-}$ anion forms a chromophore with ferric ions present and on account of this gives a brownish red colour to the glass.

Cobalt: The $Co_{II}O_4$ group produces an intense blue coloration with a dominant wavelength virtually opposite to that given by the iron-selenium chromophore.

The energy and optical properties of glass containing the colouring agents iron and selenium thus results from a complex interaction between them, each of these colouring agents having a behaviour which depends strongly on the redox state and thus, on the presence of other elements likely to influence this state.

DESCRIPTION OF THE PREFERRED EMBODIMENTS

According to a first preferred embodiment of the invention, the colouring agents are present in a quantity corresponding to the following proportions (expressed in the form indicated as percentages by weight of the glass):

| | |
|---|---|
| $Fe_2O_3$ | 1.05 to 1.35% |
| Co | 0.0195 to 0.0225% |
| Se | 0.003 to 0.006% |

According to another preferred embodiment of the invention, the colouring agents are present in a quantity corresponding to the following proportions (expressed in the form indicated as percentages by weight of the glass):

| | |
|---|---|
| $Fe_2O_3$ | 1.35 to 1.65% |
| Co | 0.0175 to 0.0205% |
| Se | 0.0015 to 0.0045% |

The first preferred embodiment of the invention enables the ready formation, given the limited quantity of iron present in the composition, of a glass with the desired optical and energy characteristics: luminous transmission, measured for Illuminant A for a glass thickness of 4 mm (TLA4), of less than 20% and energy transmission, measured for a glass thickness of 4 mm (TE4), of less than 20%. The other preferred embodiment of the invention facilitates the formation of a very dark grey glass which has a higher selectivity (selectivity being defined as the ratio of luminous transmission to energy transmission) as a result of the higher iron content.

The total energy transmission of coloured glass according to the invention, as measured for a glass thickness of 4 mm (TE4), is preferably greater than 10%. This limits the heating of the glass by absorption of solar radiation in the case of intense sunlight.

The total energy transmission of the coloured glass, as measured for a glass thickness of 4 mm (TE4), is preferably less than 15%. Such a total energy transmission is particularly well suited to the envisaged applications, especially as vehicle roof panels or as glazing panels for buildings in hot countries.

It is desirable that the total luminous transmission of the glass, measured for Illuminant A for a thickness of 4 mm (TLA4), should be more than 12%, preferably more than 15%. Such minimum values of light transmission provide sufficient vision through the glass.

The presence of iron and selenium colouring agents within the limits defined above enables a strong absorption to be achieved in the ultra violet range. Glass according to the invention preferably possesses a total transmission in the ultra-violet range (TUVT4) of less than 10%, or even less than 5%. This property is particularly advantageous in the automotive field. The low transmission of ultra-violet radiation enables the ageing and discolouration of interior trim in motor vehicles to be avoided.

The coloured glass can contain cerium if it is required to diminish even further the total transmission of the glass in the ultra-violet range (TUVT4).

The excitation purity of very dark grey glass according to the present invention is preferably less than 12%. According to its dominant wavelength, the very dark grey glass according to the invention can present a coloured shade, for example green or yellow or, preferably, bluish.

Such a glass is preferably used in the form of sheets, for example sheets having a thickness of 4 or 5 mm for the manufacture of roof panels for motor vehicles or having thicknesses of more than 4 mm in building panels.

The very dark grey glass can carry a coating formed of at least one metal oxide, for example a coating composed of titanium oxide, tin oxide, iron oxide, cobalt oxide, chromium oxide or a mixture of these. Such coated glass has the properties of very low light and energy transmission. Moreover the coatings enable the heating of the glass by intense sunshine to be limited.

Glass according to the present invention can be manufactured by traditional methods. As raw materials there can be used natural materials, recycled glass, slag or a combination thereof. The colouring agents are not necessarily added in the form indicated, but this way of giving the quantities of added colouring agents, in equivalents in the forms indicated, corresponds to current practice. In practice, iron is added in the form of rouge, cobalt is added in the form of a hydrated sulphate, such as $CoSO_4.7H_2O$ or $CoSO_4.6H_2O$, and selenium is added in the elementary form or in the form of a selenite such as $Na_2SeO_3$ or $ZnSeO_3$. Other elements may be present as impurities in the raw materials used in the manufacture of glass according to the invention (for example manganese oxide in proportions of the order of 50 ppm, or small proportions of vanadium or chromium), which may be from the natural materials, the recycled glass or the slag, but when the presence of these impurities does not impart to the glass any properties beyond the above-defined limits the glass is taken as conforming to the present invention.

The present invention is illustrated by the following specific examples of compositions.

EXAMPLES 1 to 15

Table I gives the base composition of the glass as well as the constituents of the vitrifiable batch to be melted in order to produce glasses according to the invention (the quantities being expressed in kilogrammes per tonne of vitrifiable batch). Table IIa, IIb and IIc give the colorants to be added to the batch (the quantities being expressed in kilogrammes for one tonne of vitrifiable raw materials) and the proportions by weight of colouring agents in the glass produced. These proportions are determined by X-ray fluorescence of the glass and converted into the molecular species indicated. Tables IIIa, IIIb and IIIc give the optical and energy properties corresponding to the definitions given in the present description.

Example 10 relates to a glass in accordance with Example 6 on which a layer of titanium dioxide with a thickness between 45 and 50 nm was deposited. This layer was deposited by pyrolysis of an organic titanium compound on the hot glass.

Example 11 relates to a glass in accordance with Example 6 on which a layer of iron, cobalt and chromium oxides was deposited. Such a layer has a thickness of between 35 and 45 nm. It contains, in proportions by weight, 62% of cobalt oxide, 26% of iron oxide and 12% of chromium oxide. Such a layer is easily obtained by pyrolysis of organometallic reagents such as acetylacetonates, on the glass ribbon whilst it is still at a very high temperature, at the exit from a float tank.

TABLE I

| BASE GLASS | |
|---|---|
| Analysis of the base glass | |
| $SiO_2$ | 72.0% |
| $Al_2O_3$ | 0.8% |
| CaO | 8.8% |
| MgO | 4.2% |
| $Na_2O$ | 14.1% |
| $K_2O$ | 0.1% |
| Constituents of the base glass | |
| Sand | 571.3 |
| Feldspar | 29.6 |
| Limestone | 35.7 |
| Dolomite | 162.1 |
| $Na_2CO_3$ | 181.1 |
| Sulphate | 5.0 |
| Nitrate | 15.2 |

TABLE IIa

| Example No: | 1 | 2 | 3 | 4 | 5 |
|---|---|---|---|---|---|
| Colouring agents (kg) calculated in the form of: | | | | | |
| $Fe_2O_3$ | 10.48 | 10.90 | 10.31 | 10.57 | 9.56 |
| CoO | 0.301 | 0.251 | 0.251 | 0.194 | 0.209 |
| Se | 0.086 | 0.115 | 0.100 | 0.078 | 0.105 |

TABLE IIa-continued

| Example No: | 1 | 2 | 3 | 4 | 5 |
|---|---|---|---|---|---|
| Colouring agents (quantity by weight in the glass) calculated in the form of: | | | | | |
| $Fe_2O_3$ (%.) | 1.32 | 1.37 | 1.30 | 1.33 | 1.21 |
| Co (ppm) | 288 | 240 | 240 | 186 | 200 |
| Se (ppm) | 42 | 56 | 49 | 38 | 51 |

TABLE IIb

| Example No: | 6 | 7 | 8 | 9 | 10 |
|---|---|---|---|---|---|
| Colouring agents (kg) calculated in the form of: | | | | | |
| $Fe_2O_3$ | 9.73 | 10.90 | 10.48 | 10.9 | 9.73 |
| CoO | 0.217 | 0.212 | 0.240 | 0.191 | 0.217 |
| Se | 0.068 | 0.074 | 0.078 | 0.082 | 0.068 |
| Colouring agents (quantity by weight in the glass) calculated in the form of: | | | | | |
| $Fe_2O_3$ (%.) | 1.23 | 1.35 | 1.32 | 1.37 | 1.23 |
| Co (ppm) | 208 | 203 | 230 | 183 | 208 |
| Se (ppm) | 33 | 36 | 38 | 40 | 33 |

TABLE IIc

| Example No: | 11 | 12 |
|---|---|---|
| Colouring agents (kg) calculated in the form of: | | |
| $Fe_2O_3$ | 9.73 | 12.00 |
| CoO | 0.217 | 0.199 |
| Se | 0.068 | 0.062 |
| Colouring agents (quantity by weight in the glass) calculated in the form of: | | |
| $Fe_2O_3$ (%.) | 1.23 | 1.50 |
| Co (ppm) | 208 | 190 |
| Se (ppm) | 33 | 30 |

TABLE IIIa

| Example No: | 1 | 2 | 3 | 4 | 5 |
|---|---|---|---|---|---|
| Properties of the glass | | | | | |
| TL (%) | 6.8 | 9.2 | 7.8 | 13.1 | 10.3 |
| TLA4 (%) | 10.7 | 13.8 | 12.2 | 18.1 | 15.2 |
| TE4 (%) | 15.8 | 18.8 | 15.0 | 19.2 | 18.3 |
| P (%) | 11.2 | 9.6 | 4.6 | 9.8 | 9.7 |
| λD (nm) | 476.2 | 581.0 | 580.6 | 574.1 | 578.0 |
| TUVT4 (%) | 2.1 | 1.9 | 2.4 | 2.5 | 2.2 |

TABLE IIIb

| Example No: | 6 | 7 | 8 | 9 | 10 |
|---|---|---|---|---|---|
| Properties of the glass | | | | | |
| TL(%) | 13.4 | 10.9 | 9.1 | 11.2 | |
| TLA4 (%) | 17.8 | 15.4 | 13.2 | 16.0 | 14.1 |
| TE4 (%) | 17.4 | 13.1 | 11.9 | 14.4 | 15.1 |

TABLE IIIb-continued

| Example No: | 6 | 7 | 8 | 9 | 10 |
|---|---|---|---|---|---|
| P (%) | 7.1 | 2.1 | 5.3 | 11.2 | |
| λD (nm) | 486.2 | 533.4 | 487.8 | 570.1 | |
| TUVT4 (%) | 2.6 | 2.1 | 2.3 | 2.5 | 1.7 |

TABLE IIIc

| Example No: | 11 | 12 |
|---|---|---|
| Properties of the glass | | |
| TL(%) | | 11.4 |
| TLA4 (%) | 9.5 | 15.8 |
| TE4 (%) | 12.1 | 13.1 |
| P (%) | | 4.3 |
| λD (nm) | | 513.0 |
| TUVT4 (%) | <1 | <2 |

What is claimed is:

1. Soda lime glass, comprising:
   glass-forming constituents for soda lime glass; and
   coloring agents consisting essentially of iron, cobalt and selenium expressed in the form indicated in an amount as percent by weight of the soda lime glass as follows:
   from 1.00 to 1.65% of $Fe_2O_3$;
   from 0.017 to 0.030% of Co; and
   from 0.001 to 0.010% of Se,
wherein the soda lime glass has a very dark grey color, a total luminous transmission measured for Illuminant A for a glass thickness of 4 mm (TLA4) of less than 20%, and a total energy transmission measured for a glass thickness of 4 mm (TE4) which is greater than 10% and less than 20%.

2. The soda lime glass according to claim 1, wherein the coloring agents are present in an amount expressed in the form indicated as percent by weight of the soda lime glass as follows:
   from 1.05 to 1.35% of $Fe_2O_3$;
   from 0.0195 to 0.0225% of Co; and
   from 0.003 to 0.006% of Se.

3. The soda lime glass according to claim 1, wherein the coloring agents are present in an amount expressed in the form indicated as percent by weight of the soda lime glass as follows:
   from 1.35 to 1.65% of $Fe_2O_3$;
   from 0.0175 to 0.0205% of Co; and
   from 0.0015 to 0.0045% of Se.

4. The soda lime glass according to claim 1, wherein the total energy transmission measured for a thickness of 4 mm (TE4) is less than 15%.

5. The soda lime glass according to claim 1, wherein the total luminous transmission measured for Illuminant A for a thickness of 4 mm (TLA4) is greater than 12%.

6. The soda lime glass according to claim 5, wherein the total luminous transmission measured for Illuminant A for a thickness of 4 mm (TLA4) is greater than 15%.

7. The soda lime glass according to claim 1, further comprising cerium.

8. The soda lime glass according to claim 1, wherein the total transmission in the ultra-violet region measured for a thickness of 4 mm (TUVT4) is less than 10%.

9. The soda lime glass according to claim 8, wherein the total transmission in the ultra-violet region measured for a thickness of 4 mm (TUVT4) is less than 5%.

10. The soda lime glass according to claim 1, having an excitation purity of less than 12%.

11. A sheet of glass, comprising the soda lime glass according to claim 1.

12. Soda lime glass, comprising:

glass-forming constituents for soda lime glass; and coloring agents consisting essentially of iron, cobalt and selenium expressed in the form indicated in an amount as percent by weight of the soda lime glass as follows:

from 1.00 to 1.65% of $Fe_2O_3$;

from 0.017 to 0.030% of Co; and from 0.001 to 0.010% of Se, wherein the soda lime glass has a very dark grey color, wherein the soda lime glass has a total luminous transmission measured for Illuminant A for a glass thickness of 4 mm (TLA4) which is greater than 12% and less than 20%, and wherein the soda lime glass has a total energy transmission measured for a glass thickness of 4 mm (TE4) which is less than 20%.

13. The soda lime glass according to claim 12, wherein the coloring agents are present in an amount expressed in the form indicated as percent by weight of the soda lime glass as follows:

from 1.05 to 1.35% of $Fe_2O_3$;

from 0.0195 to 0.0225 % of Co; and from 0.003 to 0.006% of Se.

14. The soda lime glass according to claim 12, wherein the coloring agents are present in an amount expressed in the form indicated as percent by weight of the soda lime glass as follows:

from 1.35 to 1.65% of $Fe_2O_3$;

from 0.0175 to 0.0205% of Co; and from 0.0015 to 0.0045% of Se.

15. The soda lime glass according to claim 12, wherein the total energy transmission measured for a thickness of 4 mm (TE4) is less than 15%.

16. The soda lime glass according to claim 12, wherein the total luminous transmission measured for Illuminant A for a thickness of 4 mm (TLA4) is greater than 15%.

17. The soda lime glass according to claim 12, further comprising cerium.

18. The soda lime glass according to claim 12, wherein the total transmission in the ultra-violet region measured for a thickness of 4 mm (TUVT4) is less than 10%.

19. The soda lime glass according to claim 18, wherein the total transmission in the ultra-violet region measured for a thickness of 4 mm (TUVT4) is less than 5%.

20. The soda lime glass according to claim 12, having an excitation purity of less than 12%.

21. A sheet of glass, comprising the soda lime glass according to claim 12.

22. The soda lime glass according to claim 1, wherein the coloring agents consist of iron, cobalt and selenium expressed in the form indicated in an amount as percent by weight of the soda lime glass.

23. The soda lime glass according to claim 12, wherein the coloring agents consist of iron, cobalt and selenium expressed in the form indicated in an amount as percent by weight of the soda lime glass.

* * * * *